United States Patent [19]

Cooper

[11] Patent Number: 5,434,020
[45] Date of Patent: Jul. 18, 1995

[54] CONTINUOUS-FEED ELECTROCHEMICAL CELL WITH NONPACKING PARTICULATE ELECTRODE

[75] Inventor: John F. Cooper, Oakland, Calif.

[73] Assignee: The Regents of the University of California, Oakland, Calif.

[21] Appl. No.: 152,964

[22] Filed: Nov. 15, 1993

[51] Int. Cl.6 .............................................. H01M 6/48
[52] U.S. Cl. .................................. 429/210; 429/221; 429/229; 429/233; 429/234; 429/239; 429/245
[58] Field of Search ............... 204/237, 242, 263, 283, 204/284; 429/210, 221, 229, 233, 234, 239, 245

[56] References Cited

U.S. PATENT DOCUMENTS

| | | | |
|---|---|---|---|
| 3,879,225 | 4/1975 | Backhurst et al. | 136/86 D |
| 3,887,400 | 6/1975 | Doniat et al. | 136/86 A |
| 3,981,747 | 9/1976 | Doniat et al. | 429/15 |
| 3,981,787 | 9/1976 | James et al. | 204/263 |
| 4,126,733 | 11/1978 | Doniat | 429/12 |
| 4,147,839 | 4/1979 | Solomon et al. | 429/15 |
| 4,278,521 | 7/1981 | Kreysa | 204/263 |
| 4,842,963 | 6/1989 | Ross, Jr. | 429/21 |
| 4,927,718 | 5/1990 | Ross, Jr. | 429/44 |
| 5,006,424 | 4/1991 | Evans et al. | 429/15 |
| 5,121,044 | 6/1992 | Goldman | 320/2 |
| 5,145,752 | 9/1992 | Goldstein et al. | 429/27 |
| 5,185,218 | 2/1993 | Brokman et al. | 429/27 |
| 5,190,833 | 3/1993 | Goldstein et al. | 429/27 |
| 5,208,526 | 5/1993 | Goldman et al. | 320/2 |

OTHER PUBLICATIONS

J. R. Goldstein and B. Koretz, "Test of a Full-Sized Mechanically Rechargeable Zinc-Air Battery in an Electric Vehicle", Paper No. 93410, *Proceedings of the 28th Intersociety Energy Conversion Engineering Conference*, American Chemical Society, Atlanta, Georgia, Aug. 8–13, 1993, vol. 2, pp. 2.279–2.284.

Primary Examiner—Kathryn Gorgos
Attorney, Agent, or Firm—Henry P. Sartorio; Daryl Grzybicki

[57] ABSTRACT

An electrochemical cell providing full consumption of electrochemically active particles in a nonpacking, electrolyte-permeable bed has a tapered cell cavity bounded by two nonparallel surfaces separated by a distance that promotes bridging of particles across the cavity. The gap/particle size ratio is maintained as the particles are consumed, decrease in size, and travel from the point of entry to the narrower end of the cell. A cell of this configuration supports a bed of low packing density maintained in a dynamic steady state by alternate formation and collapse of particle bridges across the gap and associated voids over the entire active area of the cell. The cell design can be applied to refuelable zinc/air cells and zinc/ferrocyanide storage batteries.

25 Claims, 6 Drawing Sheets

Top View**

CONTINUOUS-FEED ELECTROCHEMICAL CELL WITH NONPACKING PARTICULATE ELECTRODE

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The invention relates to the design of a tapered electrochemical cell having an electrode formed of a bed of electrochemically active particles through which an electrolyte circulates. In particular, the dimensions of the cell cavity promote bridging of particles across the cavity and formation of voids to maintain a highly permeable bed.

2. Description of Related Art

Metal/air batteries, such as zinc/air batteries, have long held promise for application in stationary and mobile power sources because of their high energy density, low cost, and use of benign materials. Zinc/air batteries, for example, typically are made of zinc: (as an anode material), an electrolyte solution (usually alkaline NaOH or KOH), and a gas-diffusion electrode. The gas diffusion electrode is typically a porous structure through which atmospheric oxygen diffuses to an electrolyte-wetted and catalyzed surface, where oxygen is reduced ultimately to hydroxide. Such gas diffusion electrodes can be made of porous carbon particles bonded to a supporting and conducting positive screen, catalyzed with noble metals or organo-metallic compounds, and wet-proofed on the air side with fluorocarbon materials.

Secondary batteries, as described in U.S. Pat. No. 4,842,963 by Ross, may use a zinc electrode supported on a porous carbon substrate, which is alternately charged and discharged by electrochemical means. Primary batteries use a consumable solid or particulate zinc anode and are not generally recycled. LUZ, Inc., has constructed a zinc/air fuel battery wherein cassettes containing zinc particles are discharged in a vehicle, then removed and recycled at a fixed industrial site. (See J. R. Goldstein and B. Koretz, Tests of a Full-Sized Mechanically Rechargeable Zinc-Air Battery in an Electric Vehicle", Paper No. 93410, *Proceedings of the 28th Intersociety Energy Conversion Engineering Conference*, American Chemical Society, Atlanta, Ga., Aug. 8-13, 1993, p. 2.279)

A zinc/air fuel battery using particles of zinc added from outside may provide propulsion energy for an electric vehicle. Zinc particles and alkaline solution could be added periodically, in a manner analogous to refueling an automobile. At the same time, the spent electrolyte (containing zincate and zinc oxide) produced during previous discharge would be removed from the vehicle. The zinc metal and fresh electrolyte would be regenerated from this spent electrolyte by electrolysis and/or various chemical or thermal reduction techniques at a fixed industrial or service site. Thus, a fixed quantity of zinc would be recycled indefinitely between recovery equipment and the vehicle, and the vehicle could be refueled rapidly at a service station for indefinite range extension. Such an application is particularly attractive in fixed route vehicles, such as vans and buses, which may be refueled periodically at a single site on the route.

Conventional zinc/air fuel batteries developed for electric vehicles are broadly classified as either "fluidized bed" or "static bed" systems. Zinc particle/air batteries developed for vehicles often make use of a fluidized or slurried suspension of zinc particles in an electrolyte. According to known solid flow behavior, random close packing of solid spheres into a fluid-filled cavity results in a bed of 63% solid fraction. Frictional spheres will reduce this solid fraction to about 58–63%. If parallel walls of the cavity are separated by 2.53 diameters of the sphere, then the packing density falls to about 49 or 53%, respectively. This substantial reduction in solid fraction (by 20% of close packing figure) greatly reduces hydraulic resistance of the bed.

Backhurst et al. (U.S. Pat. No. 3,879,225) teaches an electrode arrangement for an electrochemical cell which uses an upwards flowing electrolyte to expand and to fluidize a zinc particle bed; the particles make momentary contact with a negative current collector during discharge. Backhurst shows that a tapered cell bottom provides a point of electrolyte entry giving the electrolyte sufficient velocity to fluidize the bed, while permeable membrane walls and lower velocities in the bulk of the cell prevent loss of particles from the cell.

Doniat et al. (U.S. Pat. No. 3,887,400) provides a method for the use of a fluidized suspension of zinc particles that make momentary and intermittent contact with a negative (anode) current collector, then reside in the bulk of the slurry out of contact with the negative while reaction products diffuse away from the zinc particle surface. Doniat et al. (U.S. Pat. No. 3,981,747) further provides a means for continuous recharge of a slurried suspension of zinc particles by periodic contact with a more electronegative metal (e.g., aluminum), followed by subsequent discharge of the zinc by momentary contact with an anodic current collector.

Solomon et al. (U.S. Pat. No. 4,147,839) teaches a means for fluidizing a bed of zinc powder by use of impellers located within each cell and various methods for transfer of such slurried zinc particles to and from the cell under influence of a pressure difference ("hydraulic transfer"). In addition to dense zinc particles, the zinc may reside as a coating on inert particle cores (Doniat, U.S. Pat. No. 4,126,733); fluidized bed discharge is similar to that for dense particles as long as the cores remain coated.

Fluidized bed systems have several disadvantages. The continuous fluidization to overcome particle settling consumes energy, up to 5% of the gross output of the cell. Also, very small particles are required to provide high power densities (W/cm$^2$ of cell cross-sectional area) due to the short contact time between the particles and the collector and the necessity to maximize the area/volume ratio of the particles. The pumping of the fluidized bed between series-connected cells requires a substantial pressure drop and allows a shunt current to flow through the suspension; Jacquelin, however, teaches a method of ameliorating this current (U.S. Pat. No. 4,038,458). Finally, the fluidized zinc particles tend to abrade the fragile interelectrode separator, the current collectors, and other cell components, requiring more robust structures with high electrical resistance or increased weight.

To avoid these problems, Evans et al. (U.S. Pat. No. 5,006,424) teaches the use of a "static" bed anode consisting of zinc particles, through which electrolyte is allowed to flow by natural convection, driven by the density difference between the electrolyte in the pores of the bed and the electrolyte in a circulation duct external to the bed. A concentration difference develops during discharge, which results in the build-up of dissolved zincate and suspended solid reaction products in the interstices between the zinc particles. Because the bed is not fluidized, mass transport requirements of the cell can be met without the use of mechanical pumps to levitate the bed. The energy loss for transport is very small as long as the bed maintains a low hydraulic resistance. Either solid particles or metal-coated inert cores can be used.

Developers at LUZ, Inc. have disclosed several versions of zinc particle anodes configured as static beds. Goldstein et al. (U.S. Pat. No. 5,145,752) discloses a means for using very fine zinc particles (5–500 $\mu$m) in an alkaline electrolyte with a gas diffusion electrode. Brokman et al. (U.S. Pat. No. 5,185,218) further shows the use of a particulate zinc anode with a cathode depolarized by an oxygen-bearing liquid such as a fluorocarbon oil. Goldman et al. (U.S. Pat. No. 5,208,526) teaches the use of a static bed anode which surrounds an air cathode unit. In the practical vehicle battery (Goldstein and Koretz, ibid.), only 80% of the zinc in the cell is available for use, and the cassette containing the zinc must be refurbished at an industrial site in a process which recovers unconsumed zinc, zinc oxide, zincate and electrolyte. If the bed clogs with a paste of unreacted zinc, zinc oxide, zincate, and electrolyte, then high velocity electrolyte jets can be used to dislodge and remove caked material from the cell in order to recharge the cell mechanically.

In general, packed or static bed anodes have fundamental disadvantages. As the bed is consumed by anodic dissolution, the particles and interstices between particles become smaller, and hydraulic resistance increases inversely with a power function of particle size. At a fixed discharge rate, the bed eventually clogs, forming a thick paste of unconsumed zinc, electrolyte, and solid reaction products. In practice, often only about 50–80% of the zinc can be used before the entire bed and reaction products must be removed to prevent caking. If zinc coated cores are used in a static cell, the bed does not necessarily cake, but inert cores must be removed prior to mechanical recharge. The current distribution is highly non-uniform, causing some particles to be depleted of zinc before 100% consumption of the zinc in the bed.

Finally, for both dense particles and coated cores, the static bed cannot be replenished continuously under load from without (to match the rate of discharge), because of changing bed porosity and accumulation of inert cores, respectively. This requires that the total mass of zinc be located within the cell. For large vehicle applications, the zinc loading (>12 kg Zn/m$^2$) requires that the cell be excessively thick and heavy, and thereby possibly damaged by road shocks.

It would be desirable to provide a battery that has full (100%) consumption of the added particles and which maintains low resistance and does not clog or cake. Further, it would be advantageous to add particles to the bed by gravity feed from a hopper or by pumped transport as a slurry. Finally, the cell should allow electrolyte circulation through the bed for heat and mass transport with very low hydraulic power requirements.

SUMMARY OF THE INVENTION

The invention is an electrochemical cell with a tapered cavity housing a quasi-stationary, permeable bed of electrochemically reactive particles. The dimension of the cavity is everywhere a small multiple of the dimensions of the reactive particles. A preferred configuration of the invention is a wedge-shaped electrochemical cell of small included angle, opening upwards, and bounded by two nonparallel surfaces. At least one of the surfaces is a counter electrode such as an air cathode, while the other may be an electronically conductive plate impervious to electrolyte. The cell provides automatic feeding and full (100%) consumption of electrochemically active particles.

The cell walls are separated by a distance that promotes bridging of the particles across the cavity, typically about 1 to 7 times the average dimensions of the particles at the point of entry into the cell. This particular cell geometry maintains this gap/particle size ratio as the particles are consumed by electrochemical dissolution and travel from the point of entry (open end of wedge) to the opposite (narrower) end of the cell. The particle bed maintains a low packing density and low hydraulic resistance because of the formation of particle arches or bridges between the nonparallel walls. These bridges promote the development of voids beneath the bridges during subsequent particle dissolution and overall bed contraction.

The objectives of the invention are to solve simultaneously several problems of the fluidized bed and stationary bed electrodes, including:

to provide full consumption (100%) by dissolution of electrochemically active materials (such as zinc particles) introduced into the cell without clogging or caking, and without the necessity for removing unconsumed particles, reaction product cakes, or inert cores following discharge;

to design a cell that maintains a permeable bed in the steady-state of low packing density (<50%) and consequently has low hydraulic resistance to electrolyte flow, independent of the age of the bed;

to allow electrolyte circulation through the cell by either natural convection or by pumps of mechanical or air-lift (bubble) kind; but in all cases, the cell requires a very low parasitic power (<1% of gross power output) to overcome hydraulic resistance of the bed; and to design a cell that may be continuously or intermittently replenished with fresh particles of electrochemically active materials during discharge or standby without change in the electrical characteristics of the cell.

The chamber containing the particles is constructed with closely-spaced nonparallel surfaces such that the separation between these surfaces is a small multiple (1–5 for smooth walls; 1–7 for roughened walls) of the average dimensions of the particles of the electrochemically active material at the point of entry. When the particles are added to such a chamber, they do not close-pack; rather, some will form bridges or arches which span the gap between the two surfaces. As the particles decrease in size due to reactive dissolution, they tend to settle and form voids under the bridges. Eventually, a bridge will collapse only to re-form elsewhere in the bed.

The formation and collapse of bridges and voids creates an open bed structure of low packing density (generally <50% maximum). A dynamic steady state is reached in which the bridges sequentially form, collapse (due to dissolution), and re-form elsewhere in the bed such that a nearly time-invariant population of bridges and voids is achieved. The open structure allows electrolyte to flow freely into, through, and out of the cell, thus providing for heat and mass transport with a minimum of hydraulic power dissipation.

The timescale for the formation and collapse of a void is on the order of 100–200 seconds, and the voids in mature beds are uniformly distributed over the interelectrode plane. The bed is neither a "static bed" nor a "fluidized bed", but a quasi-static bed in which the distribution of voids changes in a statistically predictable fashion while maintaining a packing density intermediate between a fluidized bed and a static bed.

A preferred configuration for the cell cavity is a vertical wedge of small included angle ($\sim 0.1°-3°$) opening upwards, which is gravity fed with fresh particles from an overlying portion of the cell or from an external hopper. The wedge shape maintains a fairly constant gap/particle size ratio as the particles diminish in size and progressively move from the entry point of the cell to the bottom (narrower) part of the cell. Any cell having nonparallel surfaces separated by 1–5 times the average particle size will support the bridging phenomenon.

Important applications of the present invention include zinc/air fuel batteries and zinc/ferrocyanide storage batteries, and other galvanic and electrolysis cells having particulate electrode material contained in stationary or quasi-stationary (i.e., slowly-evolving) packed beds. The principle of the present self-feeding cell can be applied to cells or batteries which consume particles of electrochemically active metals, compounds, or composites to form reaction products that are carried from the vicinity of the particles by entrainment in the electrolyte flow. Examples of such materials are metal anodes (zinc, cadmium, lead, iron, aluminum, calcium, magnesium, lithium), inorganic cathode materials (particulate lead oxide, copper oxide), which are consumed electrochemically to form dissolved or liquid-entrained products, and chemical materials, Such as chlorine hydrate or solid ferricyanides, which dissolve in packed beds to form electrochemically active dissolved or suspended materials, using an electrolyte appropriate to the electrode materials and desired reaction.

DETAILED DESCRIPTION OF THE INVENTION

The present invention is a tapered electrochemical cell that consumes electrochemically active particles between nonparallel surfaces that are separated by a distance that promotes the bridging of particles across the cell cavity. The distance is typically about 1 to 7 times the average diameter of the particles at the point of particle entry into the cell. The cell geometry maintains a constant gap/particle size ratio as the particles dissolve and move from the opening of the cell to the tapered end of the cell. The particle bed maintains a low packing density and low hydraulic resistance because of the formation of particle arches or bridges and associated voids in the bed between the nonparallel walls.

Figure 1:
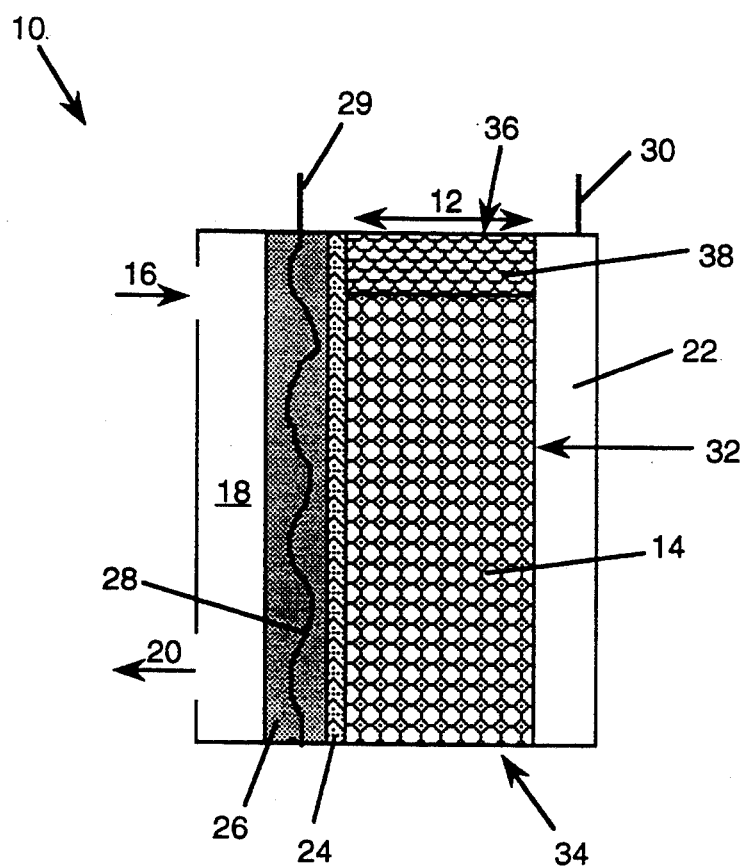
FIG. 1 is a cross-section of a conventional prismatic electrochemical cell.

For comparison, FIG. 1 shows one type of conventional prismatic metal/air cell 10 with a large, constant gap (or cell width) dimension 12. Electrochemically active particles 14 are contained between an anode current collector 22 and a porous, non-conducting separator 24, which is connected to a porous air cathode 26 with an internal current collector 28. Air flows through an intake port 16, through an air flow chamber 18 situated next to the air cathode 26, and out of an air exit port 20. A positive insulated lead 29 and a negative insulated lead 30 are connected to the current collector 28 and anode collector 22, respectively. Initially, the packed particle bed 32 is permeated with an electrolyte solution, which enters at the bottom 34 of the cell 10 and exits at the top 36, forming a layer 38 of supernatant electrolyte. After prolonged discharge, the bed 32 contracts, particle 14 size decreases, and resistance to electrolyte flow increases. Eventually, the permeability of the bed 32 is lost.

Figure 2:
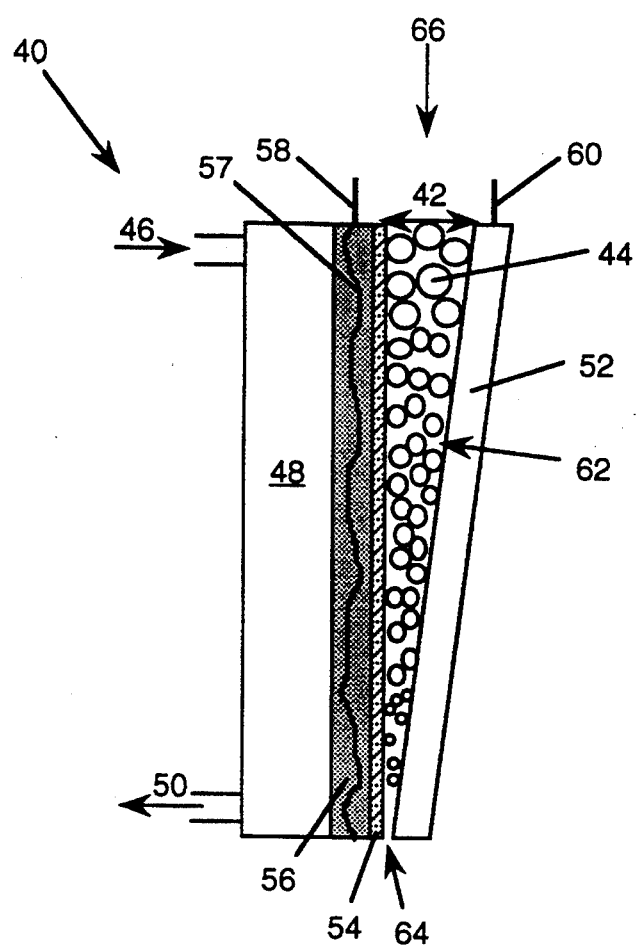
FIG. 2 is a cross-section of the present tapered electrochemical cell.

FIG. 2 shows a tapered electrochemical cell 40 according to the present invention, with a varying gap (or cell width) dimension 42, in contrast to FIG. 1. Electrochemically active particles 44 are contained between an anode current collector 52 and a porous, electronically insulating separator 54, which is connected to a gaseous diffusion cathode, such as an air cathode 56 with an internal current collector 57. Air flows through an intake port 46, through an air flow chamber 48 situated next to the air cathode 56, and out of an air exit port 50. A positive current lead 58 and a negative current lead 60 are connected to the cathode current collector 57 and anode current collector 52, respectively. The particle bed 62 is permeated with an electrolyte solution, which typically enters the narrow end 64 of the cell 40 and exits the wider end 66. (The reverse flow is also possible).

Figure 3:
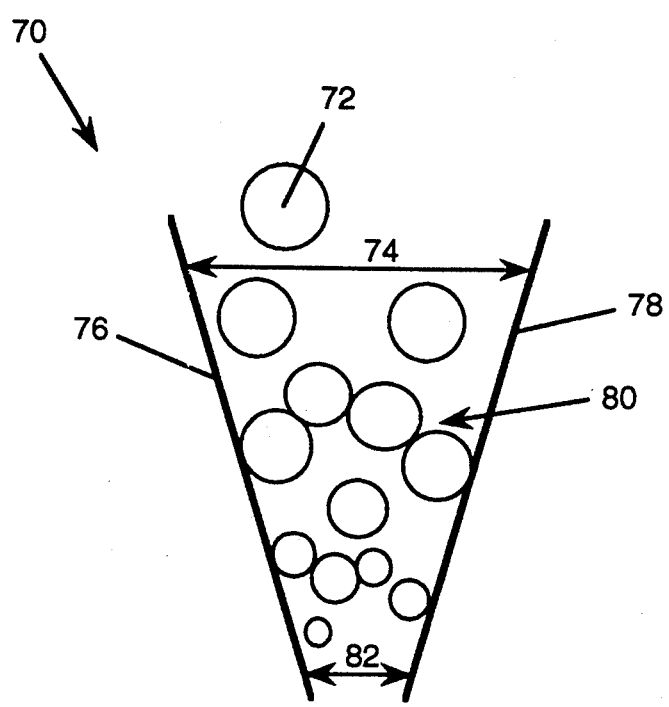
FIG. 3 is a close view of bridging particles in a tapered cell.

The tapered cell 70 design, as shown in a closer view in FIG. 3, uses the natural phenomena of two-phase flow involving solid particles and a liquid. When particles 72 are fed into the gap 74 between nonparallel surfaces or walls 76,78 separated by a distance of between 1–7 times the average particle 72 size, the particles 72 do not readily settle into a packed bed of maximum density (e.g., close packing). Rather, the particles 72 tend to form bridges or arch structures 80 which span the gap 74 when the particles flow between the nonparallel surfaces 76,78 to the narrow end 82 of the cell 70. The formation of bridges or arches 80 results from the friction between the particles 72 or between the particles 72 and the adjacent walls 76,78, and also depends on the nature of the materials, the electrolyte, and on the surface texture, micromorphology and chemical properties of the interfaces.

In general, bridge structures will span small voids for gap/particle size ratios of 1–5. The effect is most pronounced and useful in particle beds where the dimension of the gap is 2–3 times the dimensions of the particles. The phenomenon occurs under these conditions even when the bed is shaken or vibrated, but a smaller ratio (1–3) may be required. Continuously shaken, agitated, or vibrated beds tend to promote closer packing and thus decrease the gap/particle size ratio at which bridging occurs. The bridging phenomenon is readily achieved at vibrations typical of automotive road conditions.

Larger gap/particle size ratios (up to about 7) are possible if the bounding surfaces of the cell are roughened to prevent slippage and increase the friction between the particles and the walls. Wall textures that allow the particles to maintain a "toe hold" on the cell walls include screens and expanded metal meshes; roughened, pitted, ridged, or knurled plates; and woven and non-woven fabrics or meshes.

Particle morphology and size distribution also affect the extent of bridging. The formation of bridges and voids is readily illustrated in the case of spherical particles; however, any roughly equidimensional particles can be used. Examples of particle shapes which form bridges include cut wires of length equal to 0.3 to 3 times the diameter, prolate or oblate ellipsoids, irregular tear-shaped droplets formed by freezing a spray of molten metal, cubes, rectangular prisms, and particles formed by shredding or chopping metal sheets. Particles of porous material or roughened surface texture are also useful. If the particle size distribution provides sufficient particles of a suitable size, then the particle bed. may contain a substantial fraction of smaller particles not meeting the 1–7 gap/particle size ratio. Particles typically are in the size range of 0.1–5.0 mm.

The corrosion of zinc in alkaline electrolytes under certain conditions gives rise to a small amount of hydrogen gas evolution. The configuration of the present cell promotes removal of the gas by allowing large bubbles to coalesce within the voids formed by the bridging phenomenon. The buoyancy associated with these large bubbles tends to promote the opening of such bridges and the upwards movement of the bubble. The bridges re-form in the wake of the rising bubble. Hence the open bed structure allows removal of gas that would otherwise be entrapped in a dense, close-packed bed as very fine bubbles.

Particle Dissolution and Cell Geometry

If a packed bed anode chamber is constructed to have a cavity bounded by two parallel walls (separated by a constant distance), as shown in FIG. 1, then the diminution of particle size caused by dissolution will increase the ratio of gap size to particle size; eventually, an upper limit to the ratio for bridging will be exceeded and the bed will tend to compact.

However, if the cell is tapered (e.g., constructed in the shape of a wedge) and opens upwards, as shown by the present invention in FIGS. 2 and 3, then particles of suitable size (not exceeding the gap/particle size ratio of about 5) may be poured into the cavity. If one wall contains a cathode sustaining an electrochemical reaction and passing current normal to its surface, then the continuing dissolution of the particles will cause the bed to move downwards at a constant rate equal to the dissolution rate measured normal to the walls divided by the tangent of the included angle. (If both opposing walls are cathodes, then the rate of fall is twice as great). Angles separating the two walls may be chosen from about 0.05° to 5°, but acute angles of about 0.1°–0.5° are preferred, considering the dimensional stability and uniformity of the walls, and the desired height of the cell.

If the current density normal to the wall is to be roughly uniform, then the ratio of gap to particle dimensions will remain roughly constant. After a time interval of $\Delta t$, the particle has diminished in size by an amount proportional to $\Delta t$, but has fallen into a portion of cell with a gap which is thinner by an amount which is also proportional to $\Delta t$. Thus the critical gap/particle size ratio is roughly constant and independent of residence time of the particle within the cell. The tapered shape of the cell does not operate merely to promote feed, but rather to maintain indefinitely the relatively constant gap/particle size ratio allowing void formation.

In general, current density will not be uniform from top to bottom of the cell. For portions of the cell having smaller particles, a larger fraction of the particle surface area is located at a closer distance to the cathode, giving the particle a more favorable location for reaction because of the lower resistance of the current path between the active particles and the cathode. Hence small particles will tend to be anodically dissolved faster than larger particles. The effect on bed morphology will be to enhance the formation of voids in portions of the cell with smaller average particle size.

Particle size decreases as the particle is consumed, and eventually the particle vanishes. Particles smaller than a certain size are entrained in the electrolyte flow in the interstices of the particle bed. A variant of Stokes' law governs the steady-state settling velocity (v) of a free spherical particle of diameter S, under non-turbulent, viscous flow conditions:

$$v = \frac{gS^2 \Delta \rho}{18\mu};$$

where $\Delta \rho$ is the density difference between the particles and the electrolyte, and $\mu$ is the viscosity of the electrolyte. Although conditions of uniform flow and particle shape do not rigorously apply in a packed bed, one expects that an average phase velocity (v) will entrain particles smaller than the critical size S, which depends on electrolyte density and viscosity and on the square of particle size.

Figure 4A:
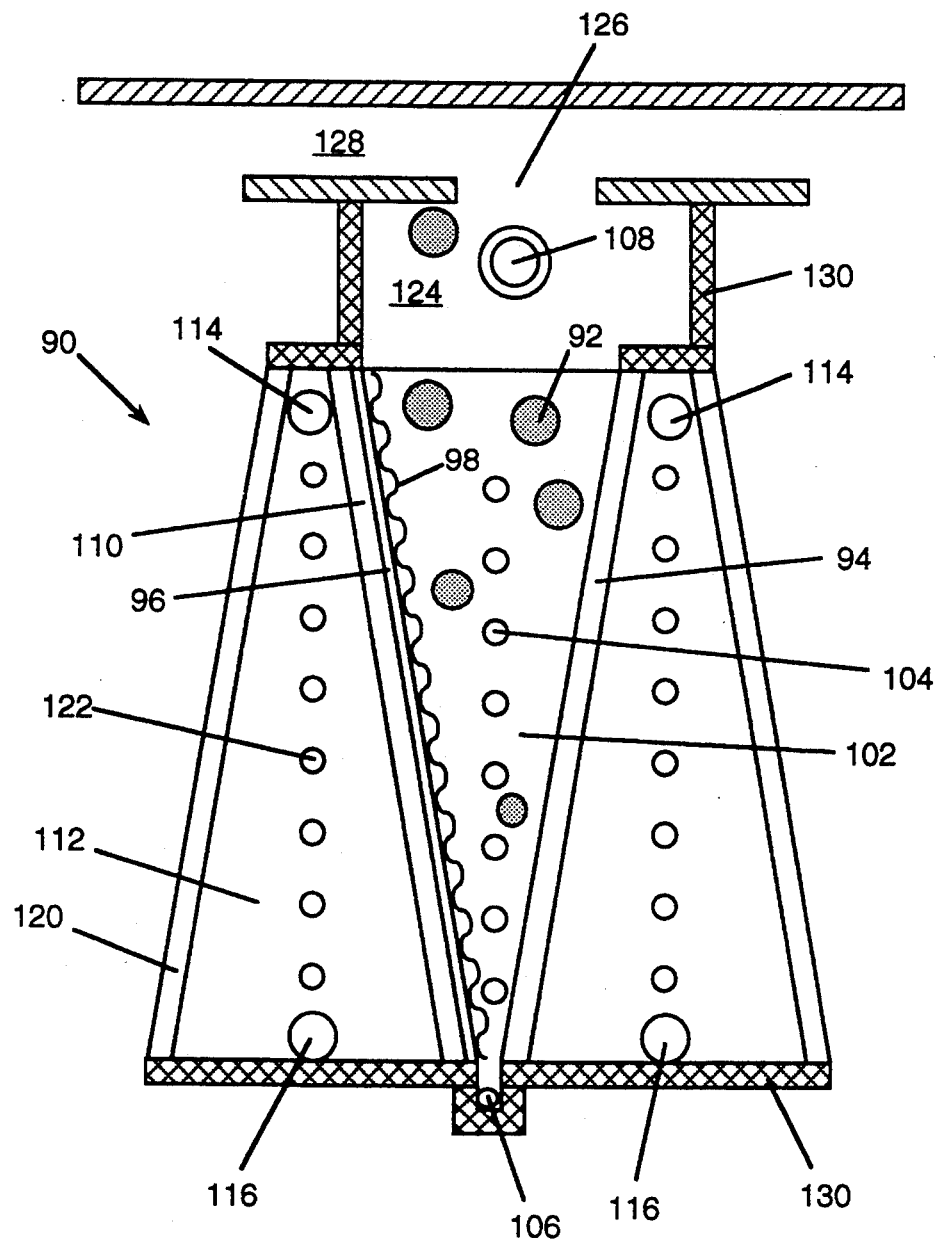
FIG. 4A is a cross-section of a bipolar tapered electrochemical cell according to the present invention.

FIG. 4A shows an embodiment of the invention as applied to a galvanic cell 90 which is configured for bipolar electrical series connection. Tapered or wedge-shaped unifunctional cells can be connected in parallel or in series. In a bipolar cell, the current flow is substantially perpendicular to the electrode throughout the cell. Current is typically passed through the body of the cell to adjacent cells connected in electrical series, without the use of external leads or buses. For purposes of clarity, the dimensions of FIG. 4A (particularly the included angle between elements 96 and 94) are greatly exaggerated.

The anode material is typically formed of particles of electrochemically active metals, compounds, or composites. Examples of electrochemically active particles include zinc particles of about 0.1–3 mm diameter, aluminum spheres of about 1–5 mm diameter, iron, cadmium or lead particles in an alkaline electrolyte, and calcium particles in mixed alkaline and halide solutions.

The particles 92 are contained between an electrically conductive transfer plate 94, such as a sheet of copper electroplated with nickel, and an electronically nonconductive, porous interelectrode separator 96, such as a wettable membrane (e.g., polymer fabric). An anode current collector 98, such as a metal screen (e.g., nickel-plated copper screen or expanded perforated metal sheet), rests against the separator 96 and makes electrical contact with the particles 92.

Figure 4B:
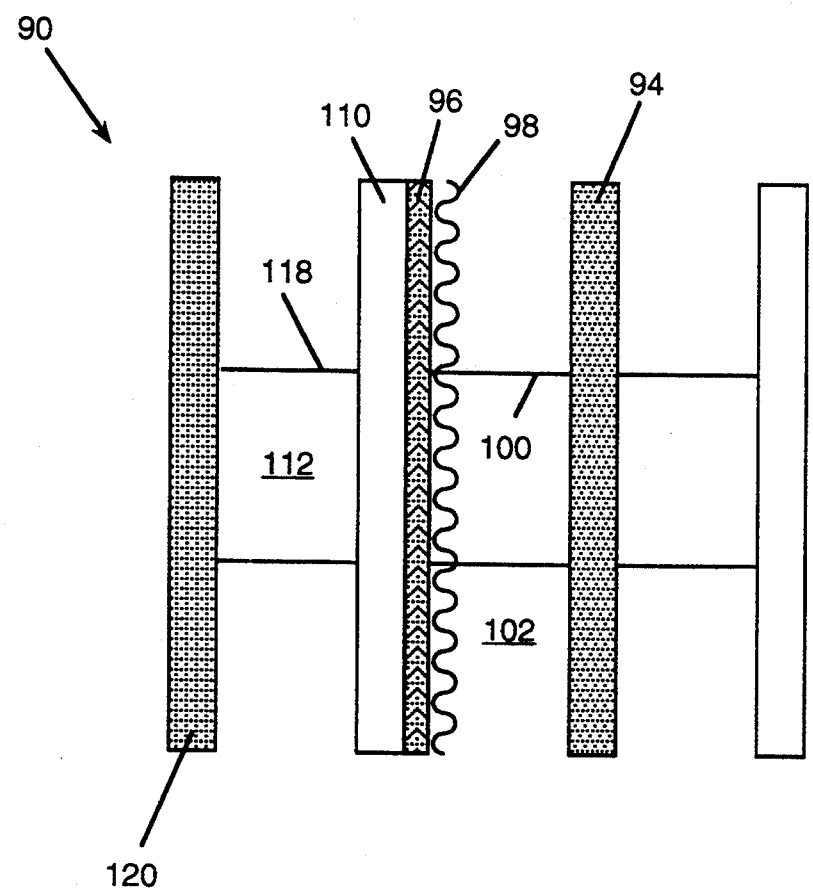
FIG. 4B is a top view of the bipolar cell of FIG. 4A.

The anode current collector 98 may be spot welded or soldered to vertical metallic or metallized plastic ribs 100, which are shown in a top view of the cell 90 in FIG. 4B. The ribs 100 define the anode chamber 102 dimensions and provide an electronically conductive path of low resistance between the anode current collector 98 and the conductive transfer plate 94. The ribs 100 are a series of perforated, lengthwise plates (shown in FIG. 4B) with holes 104 (shown in FIG. 4A) through which electrolyte may flow. Other functional designs of the ribs 100 are possible, including screens or nonperforated ribs. Line contact ribs are best supplemented with a peripheral conductive frame at the edges of the air electrode, which may be soldered to a metallic current collector internal to the air electrode.

The electrolyte enters the cell 90 through an electrolyte intake manifold 106, diffuses through the cell cavity or anode chamber 102 containing the bed of particles 92, and exits through an electrolyte exhaust port 108. The electrolyte flow may be from bottom to top as shown, or alternatively from top to bottom.

The other side of the separator 96 rests against a gas diffusion electrode 110, such as an air electrode with an internal current collector (not shown). The air electrode 110 forms one surface of an air-flow chamber 112 that is provided to allow circulation of air on the dry side of the air electrode 110. The air enters through an air intake port 114, circulates through the chamber 112, and exits through an air outlet port 116. The air electrode 110 is supported on a gridwork of electrically conductive ribs 118, as shown in FIG. 4B, which connect the air electrode 110 with a conductive transfer plate 120.

Electrical contact between the ribs 118 and the dry conductive side of the air electrode 110 is maintained by compressive forces between the ribs 118 and the air electrode 110, resulting from the mass of the particle bed. Again, the ribs 118 are a series of perforated, lengthwise plates (shown in FIG. 4B) with holes 122 (shown in FIG. 4A) that serve as air passageways. The air electrode 110 current passes through the conductive gridwork to the transfer plate 120, and through the transfer plate 120 to an adjacent anode chamber (not shown) bounded by this transfer plate. The included angle between the broad surfaces (i.e., air electrode 110 and transfer plate 94,120) is preferably in the range of about 0.1°–3°.

FIG. 4A shows the electrochemical cell 90 having an overlying portion which serves as a hopper or reservoir 124 of unconsumed particles 92, which are continuously fed by gravity into the anode chamber 102. The reservoir 124 portion of the cell 90 is increased in width to accommodate a larger fraction of the particles 92, and has a width which is preferably larger than five (5) times the diameter of the feed particles 92 to prevent bridging and allow the free flow of particles 92 into the cell 90. A slurry of particles 92 and the electrolyte are transferred through an opening 126 into the reservoir 124 from a tube or conduit 128, which allows a high-rate transfer of the slurried mixture during mechanical refueling operation. This duct 128 is empty during discharge. The cell 90 is contained in non-conductive housing 130, which is preferably formed of a polymer (e.g., injected molded polypropylene, chlorinated polyvinyl chloride, or epoxy resin filled with hollow glass spheres).

The reservoir 124 has the following important advantages, particularly in vehicular applications: (1) the cell width and anode particles may be reduced to very small dimensions, which decrease the electrolyte electrical resistive drop between transfer plate and air electrode in cells of the bipolar configuration, resulting in higher power and efficiency; (2) the mass of the anode is minimized, protecting the air electrode and separator from damage due to impulse sustained during road vibrations or shocks; and (3) the battery is refueled by the rapid transfer of a slurry of particles or pellets, not to the fragile interior of the cell, but to a robust reservoir where the walls are not damaged by abrasion or puncture.

Figure 5:
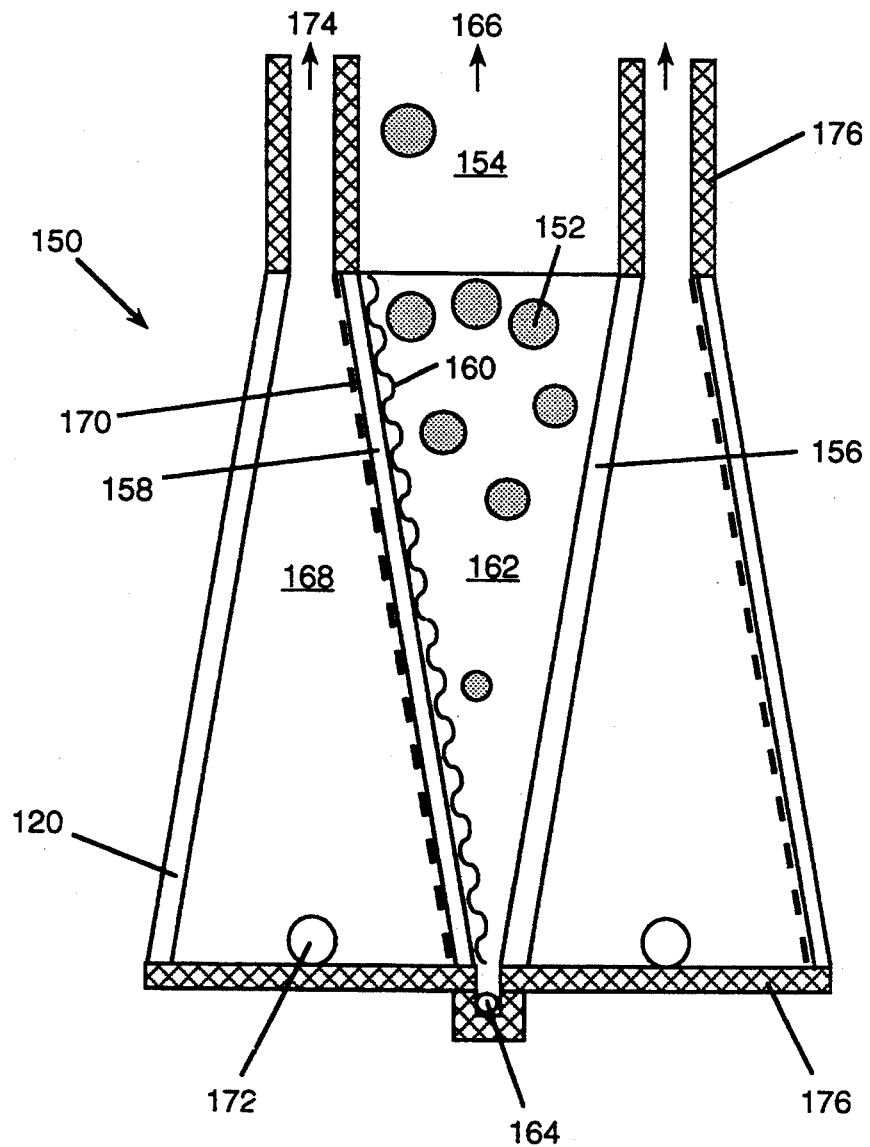
FIG. 5 shows a cross-section of another embodiment of a bipolar cell.

FIG. 5 shows another embodiment of the invention, useful as an electric storage battery; a preferred embodiment is a zinc/potassium ferricyanide battery. This battery consumes zinc particles fed continuously from an overlying hopper, which is replenished by reduction of the zincate electrolyte produced during previous discharge cycles. The continuous consumption of zinc particles allows constant discharge conditions, while the external manufacture of zinc particles of uniform size during the charge cycle avoids the progressive shape changes that occur with rigid zinc electrodes subjected to repeated cycling.

FIG. 5 shows a galvanic cell 150 of bipolar design which works similarly to the cell 90 in FIG. 4. Electrochemically active particles 152 are fed into the cell 150 from a hopper or reservoir 154 overlying the cell 150. The reservoir 154 portion of the cell 150 is preferably larger than five (5) times the diameter of the feed particles 152 to accommodate the flow of feed particles 152 into the cell 150 and to prevent bridging. The particles 152 are contained between an electronically conductive bipolar transfer plate 156 and an electrically nonconductive, porous interelectrode separator 158, such as a selective ion conducting membrane. An anode current collector 160, such as a metal screen or expanded metal, rests against the separator 158 and makes electrical contact with the zinc particles 152, and is electrically shorted to the transfer plate 156.

In a manner analogous to that shown in FIGS. 4 and 4B, the anode current collector 160 may be spot welded or soldered to a series of vertical metallic or metallized plastic ribs or perforated longitudinal plates (not shown). The ribs define the anode chamber 162 dimensions and provide an electrically conductive path of low resistance between the anode current collector 160 and the conductive transfer plate 156. The ribs are designed so that the flow of electrolyte and zinc particles is unimpeded. The electrolyte enters the cell 150 through an electrolyte intake manifold 164, diffuses through the anode chamber 162 containing the bed of particles 152, and exits through an electrolyte exhaust port 166. Reverse flow of the electrolyte through the cell 150 is also possible.

The other side of the separator 158 rests against a potassium ferri/ferrocyanide reaction vessel 168, which may comprise a porous graphite block. A perforated support plate 170 may be situated between the separator 158 and the reaction vessel 168. A potassium ferricyanide solution is fed into the reaction vessel 168 from a storage tank (not shown) through an inlet 172. The solution circulates through the vessel 168, and the resulting potassium ferrocyanide-enriched reaction product exits through an outlet port 174. The cell 150 is contained in non-conductive housing 176, which is preferably formed of a polymer (e.g., injected molded polypropylene, HD polyethylene, chlorinated polyvinyl chloride (CPVC), or epoxy resin filled with hollow glass spheres).

EXAMPLE I. ZINC/AIR BIPOLAR CELL

A zinc/air cell of the design shown in FIG. 4A having an active area of dimensions 106 mm (horizontal) and 76 mm (vertical) is discharged at a constant rate of 1.5 $kA/m^2$ for a period of six hours. The cell has a tapered geometry, 3.2 mm at the upper edge and 1.6 mm at the lower edge, and thus has an included angle of 1.2°. The cell is initially filled with cylindrical zinc particles of 1 mm length and 1 mm diameter (cut wire).

The electrolyte flow is about 1.5 ml/s and is distributed along the base of the cell with a 100 mesh screen diffuser, and allowed to flow upwards and out of the cell with an average phase velocity of about 1 cm/s. A typical electrolyte is 12N KOH+2.5% sodium orthosilicate+1% sorbitol. (The additives enhance Ah/liter capacity of the electrolyte for dissolved zinc reaction products). The temperature of the cell is kept at 60°–70° C. The air flow is four times the stoichiometric requirement, or ~0.5 l/min at 1.5 $kA/m^2$. The air exiting the cell is pumped through an arbitrary head of about 30 cm to maintain a positive air pressure relative to the electrolyte at each point in the cell.

The bed is allowed to completely discharge, rather than being replenished with fresh zinc particles. An open network of bridges and voids forms in approximately one hour, starting at the base of the cell (where the bed is thinnest) and working upwards to the top of the cell. Thereafter, for six hours, the bed maintains a population of bridges and voids which form, collapse, and re-form continually, without any apparent change in size or density. The size and density of the voids is ~1.5–2.0 mm and ~10/$cm^2$, indicating a bed (volume) expansion of about 20–30%.

Peak power densities are ~5 $kW/m^2$, and the cell voltage is roughly 1.25 V at 1 $kA/m^2$. The peak power is 27 W, and the nominal power of the cell is 10 W. The hydraulic head is 15 cm throughout the discharge process, indicating a hydraulic power consumption (including manifolding) of merely 3.4 mW. The air flow requires an additional 20 mW of pumping power (including distribution). Hence, the combined power requirements for air and electrolyte flow consume only 0.2% of the power of the cell, compared with 5% for turbulently fluidized beds.

EXAMPLE II. CONTINUOUS FEED CELL

A zinc/air cell of the design depicted in FIG. 4A having an active surface area of 600 $cm^2$ is discharged. The cell gap is <1 mm at the base and about 3 mm at the top. The added zinc particles are solidified droplets of zinc of slightly prolate ellipsoid shape with non-uniform dimensions in the range of 1.0–1.5 mm. The zinc particles are added continually at about one hour intervals for 16 hour discharges at a rate of about 1.15 $kA/m^2$. The electrolyte composition, the linear electrolyte flow rate, and the stoichiometric air flow rate are identical to Example I.

The bed is discharged into a constant load for 16 hours, during which time the particle bed is replaced several times. During the last eight hours, the particle bed is vibrated using a shaker table with sinusoidal translations at 60 Hz in three dimensions, with ~0.01 g acceleration. After one hour, the integrated current is equal to the least-squares fit of the incremental zinc additions (expressed in Ah) to within 1%. The void fraction is approximately 60%. The shaker table increases the number of voids, but decreases their average dimensions.

The particle feed to parallel anode chambers (separated by vertical ribs) is constant to within ±10%. The hydraulic head is ~15 cm and constant throughout the discharge process. Small particles (diameters below 0.1 mm) are entrained in the flow and accumulate at the top of the bed, where the velocity abruptly drops by a factor of 2.5 from that in the interior of the bed.

The foregoing description of preferred embodiments of the invention is presented for purposes of illustration and description and is not intended to be exhaustive or to limit the invention to the precise form disclosed. Many modifications and variations are possible in light of the above teaching.

What is claimed is:

1. An electrochemical cell having a nonpacking, electrolyte-permeable bed of electrochemically active particles having an average diameter, comprising a tapered cell cavity defined by at least two nonparallel cell walls separated by a distance and containing an electrolyte solution;

wherein the cell cavity has an open end where the particles enter the cell and pass through the cavity in one direction;

wherein the distance between the cell walls promotes bridging of particles across the cell cavity and formation of voids between particles in the cavity;

wherein the ratio of the distance between the cell walls at any point along the cell walls and the average diameter of the particles at that point is in the range of about 1 to 7.

2. An electrochemical cell as recited in claim 1, wherein the cell walls are substantially vertical and the particles enter the open end of the cavity.

3. An electrochemical cell as recited in claim 1, wherein the ratio is in the range of about 1 to 5.

4. An electrochemical cell as recited in claim 1, wherein the ratio is in the range of about 1 to 3.

5. An electrochemical cell as recited in claim 1, wherein the ratio is in the range of about 2 to 3.

6. An electrochemical cell as recited in claim 1, wherein at least one cell wall comprises an anode current collector, and at least one cell wall comprises a non-electronically conducting separator permeated with the electrolyte solution.

7. An electrochemical cell as recited in claim 6, further comprising:

a cathode in contact with the separator on a surface opposed to the cell cavity;

means for circulating a fluid next to the cathode on a surface opposed to the separator;

means for circulating the electrolyte solution through the cell cavity; and non-conducting means for housing the cell.

8. An electrochemical cell as recited in claim 7, wherein the cell is a metal/air cell, the cathode is a gas diffusion electrode supporting oxygen reduction, and the fluid is air.

9. An electrochemical cell as recited in claim 8, wherein the cell is a zinc/air cell.

10. An electrochemical cell as recited in claim 7, wherein the cell is a zinc/ferricyanide cell, the cathode is a porous, inert electrode supporting ferricyanide ion reduction, and the fluid is an electrolyte solution comprising ferrocyanide and ferricyanide.

11. An electrochemical cell as recited in claim 1, further comprising a reservoir overlying the cell for feeding particles into the cell cavity, wherein the width or length of the reservoir is wider than the open end of the cell cavity.

12. A bipolar electrochemical cell having a nonpacking, electrolyte-permeable bed of electrochemically active particles having an average diameter, comprising a plurality of cells connected in electrical series, wherein each cell comprises;
   a tapered cell cavity defined by at least two nonparallel cell walls separated by a distance and containing an electrolyte solution;
   wherein the cell cavity has an open end where the particles enter the cell and pass through the cavity in one direction;
   wherein the distance between the cell walls promotes bridging of particles across the cell cavity and formation of voids between particles in the cavity;
   wherein the ratio of the distance between the cell walls at any point along the cell walls and the average diameter of the particles at that point is in the range of about 1 to 7.

13. A bipolar electrochemical cell as recited in claim 12, wherein the cell walls are substantially vertical and the particles enter the open end of the cavity.

14. A bipolar electrochemical cell as recited in claim 12, wherein the ratio is in the range of about 1 to 5.

15. A bipolar electrochemical cell as recited in claim 12, wherein the ratio is in the range of about 1 to 3.

16. A bipolar electrochemical cell as recited in claim 12, wherein the ratio is in the range of about 2 to 3.

17. A bipolar electrochemical cell as recited in claim 12, further comprising:
   cell partition means disposed in at least one cell cavity, extending between the cell walls and comprising means for the diffusion of the electrolyte solution therethrough.

18. A bipolar electrochemical cell as recited in claim 12, wherein at least one cell wall comprises an anode current collector, and at least one cell wall comprises an electrically conductive transfer plate.

19. A bipolar electrochemical cell as recited in claim 18, further comprising:
   a non-electronically conducting separator permeated with the electrolyte solution in contact with the anode current collector on a surface opposed to the cell cavity;
   a cathode in contact with the separator on a surface opposed to the cell cavity;
   means for circulating a fluid next to the cathode on a surface opposed to the separator;
   means for circulating the electrolyte solution through the cell cavity; and
   non-conducting means for housing the cell.

20. A bipolar electrochemical cell as recited in claim 19, further comprising:
   cell partition means disposed in at least one fluid circulating means and comprising means for the diffusion of the fluid therethrough.

21. A bipolar electrochemical cell as recited in claim 19, further comprising a perforated support plate situated next to the separator.

22. A bipolar electrochemical cell as recited in claim 19, wherein the cell is a metal/air cell, the cathode is a gas diffusion electrode supporting oxygen reduction, and the fluid is air.

23. A bipolar electrochemical cell as recited in claim 22, wherein the cell is a zinc/air cell.

24. A bipolar electrochemical cell as recited in claim 19, wherein the cell is a zinc/ferricyanide cell, the cathode is a porous, inert electrode supporting ferricyanide ion reduction, and the fluid is an electrolyte solution comprising ferrocyanide and ferricyanide.

25. A bipolar electrochemical cell as recited in claim 12, further comprising a reservoir overlying the cell for feeding particles into the cell cavity, wherein the width or length of the reservoir is wider than the open end of the cell cavity.

* * * * *